United States Patent
Venetos

[19]

[11] Patent Number: 6,105,732
[45] Date of Patent: Aug. 22, 2000

[54] POSITIVE LOCK PARKING BRAKE ASSEMBLY

[75] Inventor: Brad Nicholas Venetos, Dayton, Ohio

[73] Assignee: General Motors Corporation, Detroit, Mich.

[21] Appl. No.: 09/187,315

[22] Filed: Nov. 4, 1998

[51] Int. Cl.[7] .............................. B60T 1/00; F16D 51/00
[52] U.S. Cl. ......................... 188/20; 188/325; 74/502.6
[58] Field of Search .................................. 188/2 D, 325; 74/502.6

[56] References Cited

U.S. PATENT DOCUMENTS

| | | | |
|---|---|---|---|
| 4,753,325 | 6/1988 | Jaksic | 188/2 D |
| 4,886,146 | 12/1989 | Copp | 188/2 D |
| 4,930,605 | 6/1990 | Boyer et al. | 188/2 D |
| 4,932,503 | 6/1990 | Yamamoto | 188/2 D |
| 4,955,458 | 9/1990 | Shellhause | 188/2 D |
| 5,142,935 | 9/1992 | Carr | 74/502.6 |
| 5,377,789 | 1/1995 | Brooks, Sr. et al. | 188/2 D |

FOREIGN PATENT DOCUMENTS 10-220506  8/1998  Japan.

*Primary Examiner*—Robert J. Oberleitner
*Assistant Examiner*—Bradley King
*Attorney, Agent, or Firm*—Robert M. Sigler

[57] ABSTRACT

A parking brake assembly for a motor vehicle includes a lever acting against a brake shoe to urge the brake shoe into contact with a brake drum. The parking brake assembly includes a clasp pivotally mounted to the lever. The clasp includes a plate portion having a slot therein. The clasp pivots to accommodate blind assembly of the cable strand to the lever. Retention to the cable is accomplished by pivoting the clasp upward and out of the way while a bullet staked at one end of the cable strand passes through the slot. The clasp drops about the cable strand and a tensile force applied to the cable strand causes the bullet to engage the plate portion of the clasp to couple the cable strand to the lever.

12 Claims, 2 Drawing Sheets

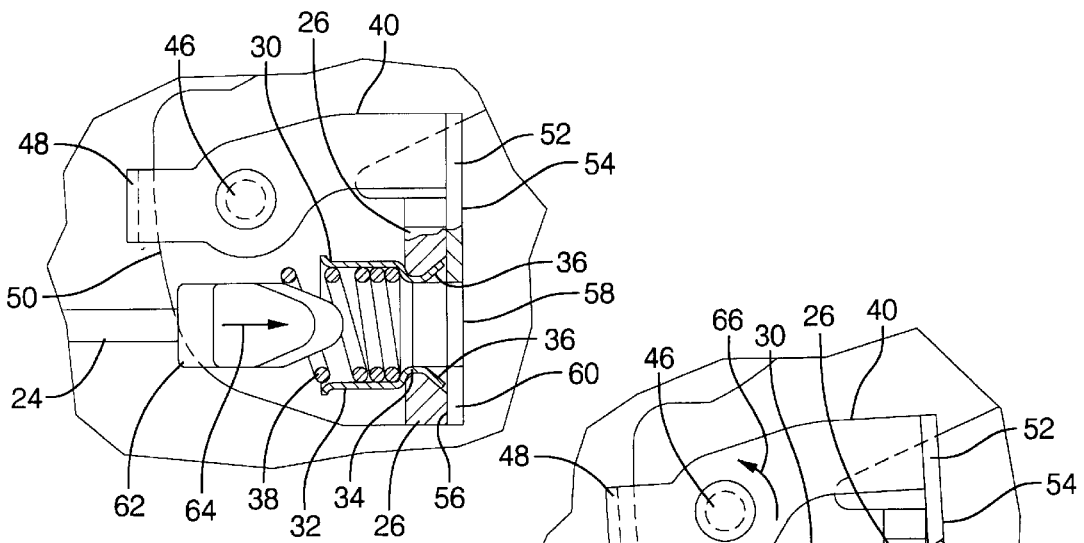
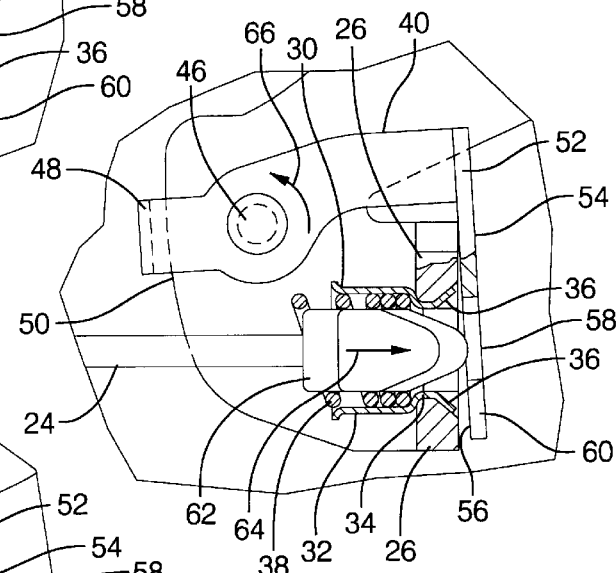
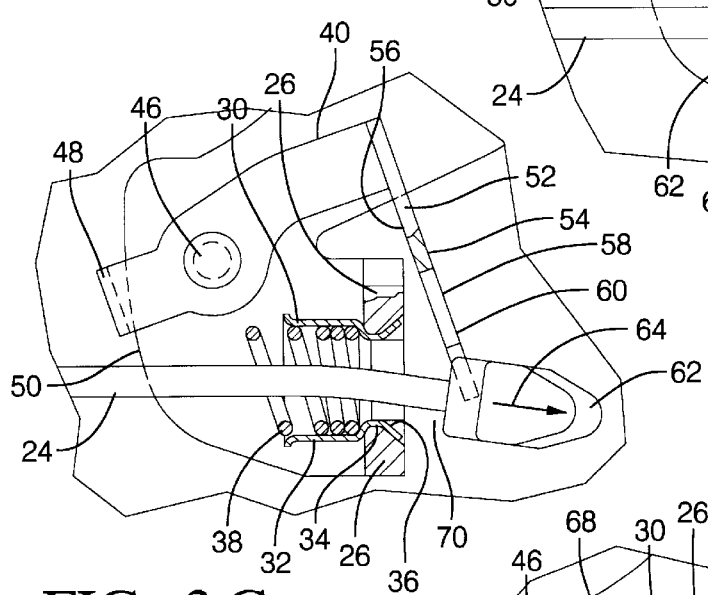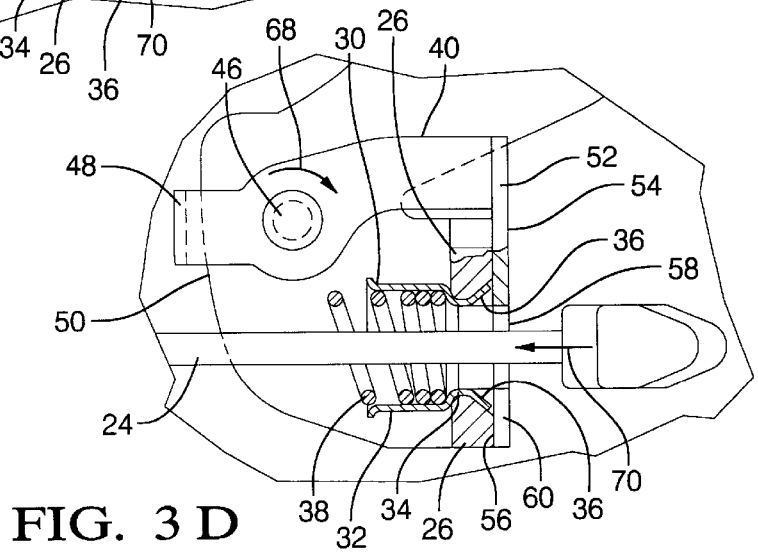
FIG. 3A
FIG. 3B
FIG. 3C
FIG. 3D

POSITIVE LOCK PARKING BRAKE ASSEMBLY

TECHNICAL FIELD

The present invention relates generally to parking brakes for motor vehicles and, more particularly, to a parking brake assembly for a motor vehicle having a positive lock between the actuating cable and the wheel brake.

BACKGROUND OF THE INVENTION

Many automotive vehicles utilize drum brake assemblies. Typically, a drum brake assembly includes a parking brake assembly. The parking brake assembly is activated by a cable connected on one end to the parking brake assembly and at the other end to a brake lever or foot pedal. Parking brake assemblies of the type associated with a drum brake assembly are well known in the art.

Assembly constraints often require that the cable be attached to the parking brake assembly and corresponding vehicle axle prior to placing or assembling the axle on the vehicle. This results in the need to somehow attach or couple the cable to the parking brake assembly and axle of the vehicle during shipping and prior to final assembly. Such an arrangement requires that the cable be threaded through a body of the vehicle and attached to the brake lever or foot pedal during the final assembly process. Such assemblies result in increased assembly time and cost.

Drum brake assemblies have been developed that allow installation of a cable to the drum brake assembly after the drum brake assembly and axle are placed on the motor vehicle. These are typically referred to as a blind assembly or connection. Such connections are known as a blind assembly because the operator cannot see or manipulate each of the components being attached within the drum brake assembly. Several types of such blind cable assemblies or connections are known. The basic design includes a brake cable having an enlarged end thereon, that is inserted through an opening in a back plate of the drum brake assembly. Once inside, the enlarged end on the cable contacts and is connected to an end of an actuating lever for the parking brake assembly that is pivotally mounted on the back plate.

SUMMARY OF THE INVENTION

The present invention is a parking brake assembly for a motor vehicle having a drum brake assembly including a back plate, a brake shoe pivotally mounted to the back plate and a brake drum. The parking brake assembly includes a lever pivotally connected to the brake shoe and operative to move the brake shoe into engagement with the brake drum. The lever includes a body with one end having at least one tang formed at a right angle to a plane of the body of the lever and extending parallel to a pivot axis of the lever. The parking brake assembly includes a retainer mounted to the lever adjacent the tang and a spring positioned in the retainer and extending outwardly from the retainer. The parking brake assembly includes a clasp pivotally connected to the lever and having a plate portion with a front surface and a rear surface and a center portion. The plate portion has a slot therein. The parking brake assembly further includes a cable strand having a bullet staked on one end thereof. The cable strand is disposed within the slot such that the bullet is positioned adjacent the front surface of the plate portion and the rear surface of the plate portion contacts the tang when a tensile force is applied to the cable strand.

One advantage of the present invention is that a parking brake assembly is provided for a motor vehicle having a positive lock of the cable to the parking brake assembly. Another advantage of the present invention is that the parking brake assembly enables a parking brake cable to be installed and connected to the parking brake lever without the use of tools and without visual confirmation.

Other features and advantages of the present invention will be readily appreciated as the same becomes better understood after reading the subsequent description when considered in connection with the accompanying drawings.

BRIEF DESCRIPTION OF THE DRAWINGS

FIGS. 3A through 3D are enlarged fragmentary views of the parking brake assembly of FIG. 1 illustrating the manner of connection of a cable strand with a lever.

DETAILED DESCRIPTION OF THE PREFERRED EMBODIMENT

Figures 1, 2:
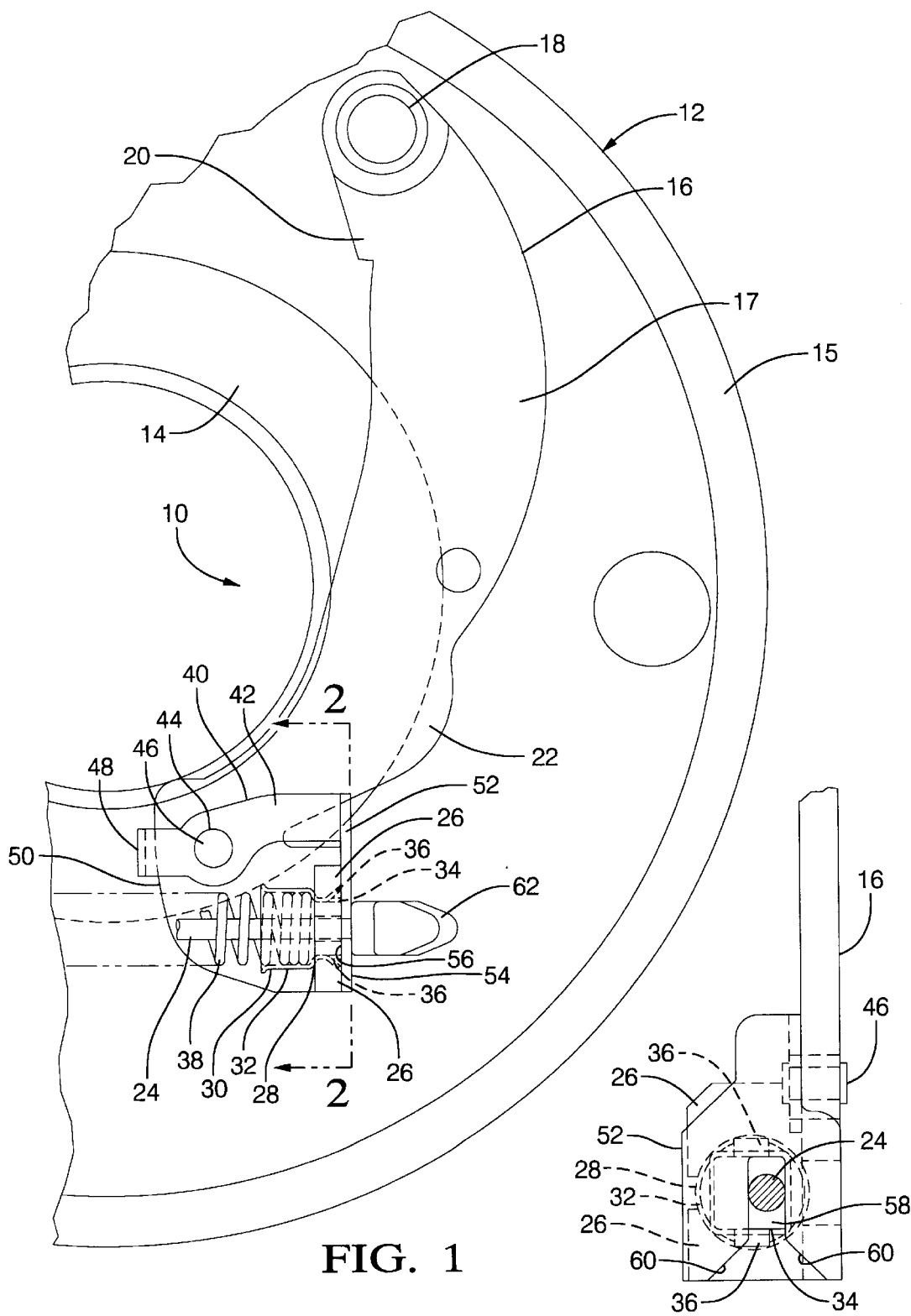
FIG. 1 is an elevational view of a parking brake assembly, according to the present invention, illustrated in operational relationship with drum brake assembly for a motor vehicle.
FIG. 2 is a view taken along lines 2—2 of FIG. 1.

Referring to the drawings, one embodiment of a parking brake assembly 10, according to the present invention, is shown in use with a conventional drum brake assembly, generally indicated at 12. The drum brake assembly 12 includes a back plate 14 and a brake shoe 15 pivotally mounted to the back plate 14. The brake shoe 15 engages a braking surface of a brake drum (not shown) to apply a braking force. It should be appreciated that drum brake assembly 12 is conventional and known in the art and thus a further description is not necessary.

The parking brake assembly 10 includes a lever 16 pivotally connected to the brake shoe 15 by a pin 18. The lever 16 has body 17 with an upper end 20 that engages the brake shoe 15 and a lower end 22 connected by a cable, including a cable strand 24, to a remote actuator such as a foot pedal or a hand operated lever (not shown). It should be appreciated that the cable strand 24 and remote actuator are conventional and known in the art.

In accordance with the present invention, the lower end 22 of the lever 16 includes at least one, preferably two tangs 26 extending at a right angle to the plane of the body 17 of the lever 16. The tangs 26 extend parallel to a pivot axis of the lever 16 formed by the pivot pin 18. The tangs 26 define a passageway 28 therebetween. The parking brake assembly 10 includes a retainer 30 disposed in the passageway 28. The retainer 30 includes an outer portion 32 and an inner portion 34. As illustrated in FIG. 1, the diameter of the outer portion 32 is greater than the diameter or size of the passageway 28. As illustrated in FIGS. 1 and 2, the outer portion 32 is substantially cylindrically shaped and has a generally circular cross-section and forms a socket that receives a spring 38. The spring 38 supported in the socket of the outer portion 32 of the retainer 30 extends rearwardly to the aperture in the back plate 14 and engages the sheath (not shown) surrounding the cable strand 24. The inner portion 34 has a generally square cross-section. The inner portion 34 has a size substantially equal to the size or width of the passageway 28. A plurality of tabs 36 positioned on the inner portion 34 are bent over during installation to secure the retainer 30 within the passageway 28. Thus, during assembly, the retainer 30 is placed within the passageway 28 and the tabs 36 are bent outward to stake the retainer 30 within the passageway 28.

It should be appreciated that while shown as two tangs 26, a flange extending at a right angle to the plane of the. body 17 of the lever 16 having an aperture therein would work as well.

The parking brake assembly 10 includes a clasp 40 having a center portion 42 with an aperture 44 extending therethrough and is pivotally connected to the lever 16 through a fastener such as a rivet 46 extending through the aperture 44 and secured in the lever 16. The clasp 40 further includes a stop 48. The stop 48 extends at a right angle to the plane of the center portion 42. The stop 48 engages a side surface 50 of the lever 16 to limit the range of pivot of the clasp 40. The clasp 40 further includes a plate portion 52 extending at a right angle to the plane of the center portion 42. The plate portion 52 includes a front surface 54 and a rear surface 56. As illustrated in FIG. 2, the plate portion 52 of the clasp 40 has a slot 58 formed therein. The slot 58 includes beveled portions 60 which, as set forth later herein, facilitate entry of the cable strand 24 into the slot 58. It should be understood that the width of the slot 58 is slightly greater than the diameter of the cable strand 24.

The parking brake assembly 10 also includes a bullet 62 staked to the end of the cable strand 24. The bullet 62 has a diameter such that it passes through the inner portion 34 of the retainer 30 yet is greater than the diameter of the cable strand 24 such that the cable strand 24 moves freely in the slot 58 until the bullet 62 rests on the front surface 54 of the clasp 40.

Turning now to FIGS. 3A through 3D, to connect the cable strand 24 with the lever 16, the bullet 62 and cable strand 24 are inserted through the an aperture (not shown) in the back plate 14 and into the open end of the spring 38. As illustrated in FIG. 3A, the bullet 62 and cable strand 24 are pushed, in the direction shown by arrow 64, through the center or hollow interior of the spring 38 which acts as a guide and supports the bullet 62 and cable strand 24 during the connection process.

As illustrated in FIG. 3B, the bullet 62 makes contact with the rear surface 56 of the clasp 40. As the bullet 62 is of a diameter greater than the width of the slot 58, continued motion of the bullet 62 in the direction shown by the arrow 64 causes the clasp 40 to pivot in the direction shown by arrow 66. Thus, the plate portion 52 of the clasp 40 begins to pivot upwardly and away from the bullet 62. As the clasp 40 rotates away from the tangs 26 and lifts upward, it exposes the lead in portion formed by the beveled portions 60 of the slot 58 and creates a partial opening 70 for the cable strand 24 and bullet 62. As set forth above, the clasp 40 is limited in its rotation about the rivet 46 by the stop 48 which engages the side surface 50 of the lever 16.

As illustrated in FIG. 3C, as the clasp 40 ceases to pivot, it urges the bullet 62 and cable strand 24 downward against the resiliency of the cable strand 24.

As illustrated in FIG. 3D, once the bullet 62 passes the plate portion 52, the cable strand 24 springs back up and the plate portion 52 drops down or pivots in the opposite direction as shown by the arrow 68 wherein the rear surface 56 of the clasp 40 engages the tangs 26. When the cable strand 24 is pulled in the direction shown by the arrow 70, the bullet 62 engages the front surface 54 of the clasp 40 as illustrated in FIG. 1. This completes the blind attachment of the cable strand 24 to the lever 16. Thus, as a parking brake actuation force is applied to the cable strand 24 by either the foot pedal or brake lever, the lever 16 pivots about the pivot pin 18 causing the upper end 20 to actuate the brake shoe 15.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed:

1. A parking brake assembly for a motor vehicle having a drum brake assembly including a back plate, a brake shoe pivotally mounted to the back plate and a brake drum, said parking brake assembly comprising:

a lever pivotally connected to the brake shoe and operative to move the brake shoe into engagement with the brake drum, said lever including a body with one end having at least one tang formed at a right angle to a plane of said body of said lever and extending parallel to a pivot axis of said lever;

a retainer mounted to said lever adjacent said tang and a spring positioned in said retainer and extending outwardly from said retainer;

a clasp pivotally connected to said lever and having a plate portion with a front surface and a rear surface and a center portion, said plate portion having a slot therein; and a cable strand having a bullet staked on one end thereof and disposed within said slot such that said bullet is positioned adjacent said front surface of said plate portion and said rear surface of said plate portion contacts said tang when a tensile force is applied to said cable strand.

2. A parking brake assembly as set forth in claim 1 wherein said clasp includes a stop, said stop engaging a side surface of said lever to limit movement of said clasp on said lever.

3. A parking brake assembly as set forth in claim 2 wherein said stop extends at a right angle to a plane of said center portion of said clasp.

4. A parking brake assembly as set forth in claim 2 wherein said slot in said plate portion includes beveled portions thereon to facilitate entry of said cable strand into said slot during installation thereof.

5. A parking brake assembly as set forth in claim 1 wherein said lever includes a pair of tangs, said tangs extending parallel to one another and forming a passageway therebetween, said retainer being disposed within said passageway.

6. A parking brake assembly as set forth in claim 5 wherein said retainer includes an inner portion and an outer portion, said inner portion being secured in said passageway.

7. A parking brake assembly as set forth in claim 6 wherein said inner portion of said retainer includes a plurality of tabs, said tabs operable to engage said tangs of said lever to secure said retainer in said passageway.

8. A parking brake assembly as set forth in claim 7 wherein said outer portion of said retainer forms a socket and a spring disposed within said socket.

9. A parking brake assembly for a motor vehicle having a drum brake assembly including a back plate, a brake shoe pivotally mounted to the back plate and a brake drum, said parking brake assembly comprising:

a lever pivotally connected to the brake shoe, said lever being operative to move the brake shoe into engagement with the brake drum, said lever having a body including an upper end and a lower end with a pair of tangs formed at a right angle to a plane of said body of said lever and extending parallel to a pivot axis of said lever, said tangs forming a passageway therebetween;

a retainer secured within said passageway, said retainer having an inner portion and an outer portion, a size of said outer portion being greater than a size of the passageway;

a spring supported in said outer portion of said retainer and extending outward from said retainer;

a clasp pivotally connected to said lever, said clasp including a stop, a center portion and a plate portion having a front surface and a rear surface, said plate portion extending perpendicular to said center portion, said plate portion having a slot therein; and a cable strand having a bullet staked on one end thereof and disposed within said slot such that said bullet is positioned adjacent said front surface of said plate portion when said rear surface of said plate portion contacts said tangs as a tensile force is applied to said cable strand.

10. A parking brake assembly as set forth in claim 9 wherein said plate portion includes beveled portions adjacent said slot, said beveled portions facilitating entry of said cable strand into said slot during installation thereof.

11. A parking brake assembly as set forth in claim 10 including a side surface on said lever, said stop engaging said side surface to limit a range of movement of said clasp.

12. A parking brake assembly as set forth in claim 11 including a rivet extending through an aperture in said clasp to secure said clasp to said lever.

\* \* \* \* \*